(12) United States Patent
Ogura

(10) Patent No.: US 6,338,812 B1
(45) Date of Patent: *Jan. 15, 2002

(54) METHOD FOR FORMING HELICAL ANTENNA

(75) Inventor: Keiichi Ogura, Kanagawa-ken (JP)

(73) Assignee: SMK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,881

(22) Filed: Jun. 18, 1999

(30) Foreign Application Priority Data

Dec. 16, 1998 (JP) .......................... 10-357583

(51) Int. Cl.[7] ......................... B29C 45/14; B29C 33/12
(52) U.S. Cl. ....................... 264/254; 264/255; 264/263; 264/266; 264/267; 264/278
(58) Field of Search ............................. 264/250, 254, 264/255, 268, 273, 274, 275, 277, 278, 266, 263, 267; 425/121, 120, 125, 126.2, 130, 577

(56) References Cited

U.S. PATENT DOCUMENTS

| | | | | |
|---|---|---|---|---|
| 3,590,329 A | * | 6/1971 | Krepps, Jr. ............... | 264/271.1 |
| 3,737,910 A | * | 6/1973 | Francis et al. ............... | 343/895 |
| 3,774,221 A | * | 11/1973 | Francis ....................... | 343/749 |
| 3,781,899 A | * | 12/1973 | Lockwood .................. | 343/880 |
| 4,193,185 A | * | 3/1980 | Liautaud ................ | 264/272.19 |
| 4,435,713 A | * | 3/1984 | Gasparaitis et al. ........ | 343/702 |
| 4,435,716 A | * | 3/1984 | Zandbergen ................ | 343/895 |
| 4,725,395 A | * | 2/1988 | Gasparaitis et al. ........ | 264/250 |
| 5,606,327 A | | 2/1997 | Elliott et al. | |
| 5,849,230 A | * | 12/1998 | Murohara ................... | 264/255 |

* cited by examiner

Primary Examiner—Angela Ortiz
(74) Attorney, Agent, or Firm—Armstrong, Westerman, Hattori, McLeland & Naughton, LLP

(57) ABSTRACT

A helical antenna having an antenna element covered with an insulating layer is formed by monolithically form the insulating layer so that the antenna element is integrated with the insulating layer. To be more precise, first, a cylindrical shell, which received a core pin in its center hole, is inserted into the antenna element along the longitudinal axis of the antenna element. The antenna element is put in a cavity of a molding die. A moulding resin which was heated and molten at a temperature higher than the melting point of the cylindrical shell is injected into the cavity to form an insulating cover over the cylindrical shell and the antenna element. The surface of the cylindrical shell starts softening upon contacting with the molten resin, and sticks around the helically coiled antenna line, whereby the pitch of the antenna element can be maintained substantially constant even if an injection pressure is applied during the molding.

4 Claims, 7 Drawing Sheets

METHOD FOR FORMING HELICAL ANTENNA

The present invention claims the benefit of the filing date of Japanese Patent Application Serial No. H10-357583, the contents of which are incorporated hereinto by reference.

BACKGROUND OF THE INVENTION

1. Field of the Invention

This invention relates to a method for forming a helical antenna having an antenna element which is covered with, for example, an insulating layer, and more particularly, to a method for forming a helical antenna, in which the antenna element is integrated into the insulating layer by monolithically moulding the insulating layer around the antenna.

2. Description of the Related Art

In recent years, helical antennas having helical antenna elements (or aerial elements) are widely used in portable communication devices, such as cellular phones, because of their wide-band characteristics and the advantage of requiring less space.

An antenna element is generally attached to a portable communication device so that it projects from the case. Accordingly, the antenna element is covered with an insulating layer for purposes of preventing the antenna element from deforming due to external forces, and preventing the resonant frequency changing.

FIGS. 9 and 10 illustrate a conventional method for forming a helical antenna having an antenna element which is covered with a monolithically moulded insulating layer.

The conventional antenna element 101 is formed by helically coiling a conductive material. One end of the antenna element 101 is fixed to a metal fitting 102. The antenna element 101 is electrically connected to the aerial coupled circuits and the transmitting/receiving circuit of a portable communication device (not shown) via the metal fitting 102 and the feeder 103 connected to the metal fitting 102.

The coil pitch P of the antenna element 101 is determined based on the resonant frequency of the helical antenna. The coil pitch is almost the same over the entire length of the antenna along the longitudinal axis.

In order to cover the antenna element 101 with the monolithically moulded insulating layer 104, a core pin 105, which functions as a moulding die, is inserted from the free end of the antenna element along its longitudinal axis, as shown in FIG. 9.

The antenna element 101, in which the core pin 105 was inserted, is accommodated in the cavity 107 which is defined by the top and bottom dies 106a and 106b, as illustrated in FIG. 10. The antenna element 101 is supported by the core pin 105 in the cavity 107 so that a prescribed gap is generated between the inner surface of the cavity 107 and the antenna element 101.

Then, a molten resin, which is the material of the insulating layer 104, is injected into the cavity 107 from the gate G to fill the gap between the antenna element 101 and the moulding dies 106a and 106b.

When the moulding resin is cured, the antenna element 101 is integrated into the insulating cover 104, whereby a helical antenna with an anternal element covered with the insulating layer is completed.

However, the conventional method has a problem that the injection pressure of the moulding resin, which forms the insulating layer, causes the coil pitch P of the antenna element 101 to change, and consequently, the electric parameters of the antenna deviate from the designed values.

For example, in FIG. 9, the pitches P1, P2, and P3 measured at three different positions (i.e., near the base, in the middle, and near the tip) along the coil axis before the moulding of the insulating cover are 2.49 mm, 2.43 mm, and 2.464 mm, which are close to each other with the offsets within the acceptable error. However, with the injection gate located near the metal fitting 102, as illustrated in FIG. 10, the pitches P1', P2', and P3' of the antenna element 101 after the moulding become 3.18 mm, 2.68 mm, and 1.44 mm, and the end portion of the antenna element 101 is undesirably compressed. This pitch divergence inevitably occurs even if the gate position is adjusted. Thus, the resonant frequency of the helical antenna greatly deviates from the designed value depending on the moulding conditions, which results in a low product yield in mass production.

In order to overcome this problem, Japanese Patent Application Laid-open No. 8-894017 discloses a helical antenna, which can prevent the pitch divergence of the antenna element 111 by forming a helical guide groove 113 in the insulating cap 112 in accordance with the coil pitch P of the antenna element 111, as shown in FIG. 11, and which can protect the antenna element 111 from external forces by bonding an insulating cover 114, which was formed in advance, around the antenna element 111 by adhesive, or by fitting the antenna element 111 into the insulating cover 114, as shown in FIG. 12.

However, the helical antenna 110 disclosed in 8-894017 requires an assembling step or a bonding step for attaching the insulating cover to the helical antenna. In addition, the bonded or fitted insulating cover cannot sufficiently protect the anternal element. If the communication device is dropped, the insulating cover 114 is likely to break or to be disengaged from the antenna element 111, and as a result, the antenna element is exposed.

SUMMARY OF THE INVENTION

The present invention was conceived in order to overcome these problems in the prior art, and it is an object of the invention to provide a method for forming a helical antenna with an antenna element covered with a monolithically formed insulating layer, which can reliably protect the antenna element from external forces, and can maintain the electric properties of the antenna element constant.

It is another object of the invention to provide a method for forming a helical antenna which does not require an extra assembling step for attaching an insulating cover to the antenna element, and which can prevent breakage or disengagement of the insulating cover, as well as undesirable exposure of the antenna element.

In order to achieve these objects, in one aspect of the invention, a helical antenna having a helical antenna element covered with an insulating layer is formed so that the antenna element and the insulating layer are monolithically moulded, and that the base of the antenna element is supported by a metal fitting. This method comprises the following steps:

(a) inserting the antenna element into an cylindrical cavity of an first moulding die, the inner diameter of the cylindrical cavity being equal to or slightly greater than the outer diameter of the antenna element;

(b) injecting an first insulating resin into the cylindrical cavity to produce a primary moulded product in which the antenna element is monolithically integrated into the first insulating resin;

(c) putting the primary moulded product in a cavity of a second moulding die so that a prescribed gap is formed between the outer surface of the primary moulded product and the inner surface of the second moulding die; and (d) injecting a second insulating resin into the cavity of the second moulding die so that the cylindrical surface of the primary moulded product is monolithically covered with an insulating layer made of the second insulting resin, whereby the antenna element is completely covered with the monolithically formed insulating layer.

Because the inner diameter of the cylindrical cavity is equal to or slightly greater than the outer diameter of the antenna element, the antenna element is inserted into the cavity with its outer surface is in contact with the inner surface of the cylindrical cavity. When the first insulating resin is injected in the cylindrical cavity, the injection pressure causes the antenna element to expand outward in the radial direction, which further causes a friction force between the antenna element and the inner face of the moulding die. This friction force prevents the antenna element from moving along its longitudinal axis (or the coil axis). When the first insulating resin is set, the antenna element having a constant pitch is completed as the primary moulded product, with little deviation.

This primary product is retained in the second moulding die, and the second moulding resin is injected in the gap between the second moulding die and the primary product in order to monolithically form the insulating layer over the outer surface of the primary product. Thus, the antenna element is covered with the insulating layer in such a manner that the antenna element and the insulating layer are integrated into a single body of the helical antenna.

Since the pitch of the antenna element is fixed by the cured first moulding resin, it does not change even if the injection pressure of the second moulding resin is applied to the primary product. Accordingly, the final product, that is, the helical antenna can have the designed electric properties. In addition, the antenna element is completely covered with the insulating layer in the monolithic manner, it is durable against an impact, and undesirable exposure of the antenna element can be prevented.

In another aspect of the invention, a helical antenna having a helical antenna element covered with an insulating layer is formed by the following steps:

(a) inserting a core pin of a moulding die into a cylindrical shell made of an insulating resin;

(b) inserting the cylindrical shell which received the core pin of the moulding die in the center hole, into the antenna element along the longitudinal axis of the antenna element;

(c) retaining the antenna element in a cavity defined by the moulding die so that a prescribed gap is formed between the antenna element and the inner surface of the moulding die;

(d) injecting a molten resin into the cavity to form an insulating cover which monolithically integrates the antenna element and the cylindrical shell;

(e) removing the core pin from the cylindrical shell, and obtaining a cylindrical antenna;

(f) covering the aperture of the cylindrical antenna with an insulating cap, whereby the helical antenna having the antenna element completely surrounded by the insulating cover is completed. In this case, the antenna element and the insulating layer are again monolithically moulded, and the base of the antenna element is supported by a metal fitting.

When the molten resin is injected into the cavity, it flows along the outer surface of the cylindrical shell inserted in the antenna element. Upon contacting with the molten resin, the cylindrical shell thermally expands and retains the inner face of the antenna element, whereby the pitch of the antenna element can be kept constant even if the injection pressure of the molten resin is applied to the antenna element.

When the moulding resin which filled the gap between the inner wall of the moulding die and the antenna element is cures, the core pin is pulled out. The resultant cylindrical antenna comprises the cylindrical shell, the antenna element, and the insulating cover which are all integrated into a single unit.

The opening of the cylindrical antenna is covered with an insulting cap. Since the pitch of the antenna element is kept constant, the designed electrical properties can be achieved with little deviation. This monolithically formed helical antenna is durable against external forces or impacts, and can prevent the antenna element from being exposed.

Preferably, the insulating resin forming the insulating cover is heated and molten at a temperature higher than at least the melting point of the insulating resin of the cylindrical shell, and the molten resin is injected into the cavity.

Because the temperature of the molten resin injected into the cavity is higher than the melting point of the cylindrical shell made of another type of insulating resin, the cylindrical shell gets softened upon contacting with the injected resin, and the helically coiled antenna element digs into the softened shell surface. Thus, the antenna element is retained by the cylindrical shell with its initial pitch kept constant.

When the moulding resin is set, the core pin is removed. Then, a helical antenna, in which the insulating cover, the antenna element, and the cylindrical shell which was softened and cured again are monolithically integrated into a single unit is completed.

Preferably, an insulating cap is monolithically formed at the opening of the cylindrical antenna by retaining the cylindrical antenna, from which the core pin has been removed, in a second moulding cavity, and by injecting a second moulding resin to form the insulating cap.

Because the insulating cap is integrated into the cylindrical antenna by injection-moulding, it does not come off even if external forces are applied. In addition, no additional steps for bonding or fixing the cap to the cylindrical antenna.

BRIEF DESCRIPTION OF THE DRAWINGS

The above and other objects, features, and advantages of the invention will be apparent from the following detailed description of the preferred embodiments with reference to the attached drawings, wherein.

DETAILED DESCRIPTION OF THE PREFERRED EMBODIMENTS

The first embodiment of method for forming an helical antenna according to the invention will be described with reference to FIGS. 1 through 3.

Figure 1:
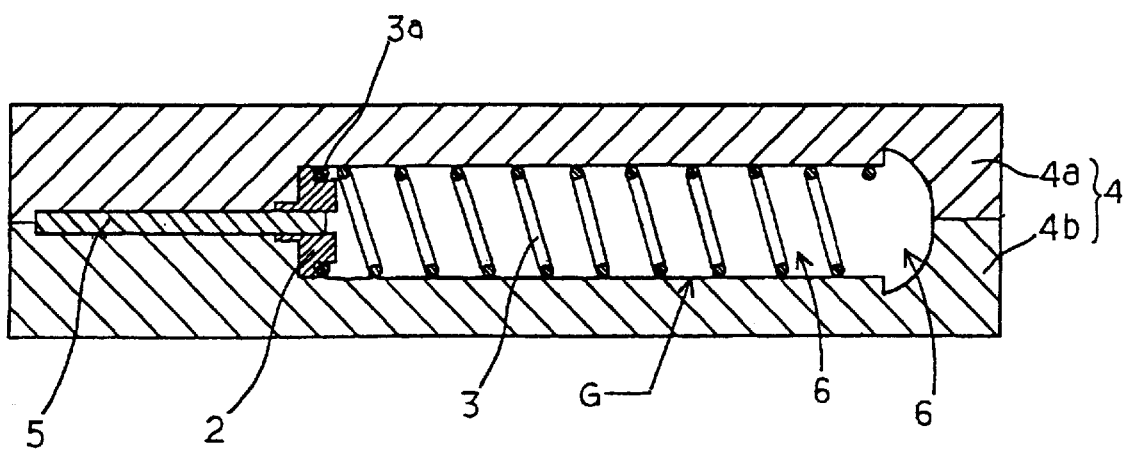
FIG. 1 is a cross-sectional view showing the first moulding step of the method for forming a helical antenna, in which the antenna element is inserted into the first moulding die, according to the first embodiment of the invention.

FIG. 1 illustrate an antenna element 3 which is supported by a metal fitting 2 at its base portion. The antenna element 3 and the metal fitting 2 are accommodated in a first moulding die 4 which consists of a top portion 4a and a bottom portion 4b. The antenna element 3 is secured to the metal fitting 2 made of a conductive material by winding the coil end 3a around the metal fitting 2, whereby the antenna element 3 is retained by the metal fitting with one end open. The antenna element 3 is also made of a conductive material, and, for example, a piano wire having a diameter of 0.5 mm is used. The antenna element 3 is coiled in a helical manner under the conditions of, for example, the outer diameter of 4.5 mm, and the coil pitch P of 2.46 mm with 10 turns, so that a prescribed resonant frequency can be obtained after the moulding.

The metal fitting 2 is a cylinder having a center hole, in which a feeder 5 made of nickel or titan alloy is firmly inserted so as to establish an electrical connection with the metal fitting 2. The feeder 5 functions as an electric supply line, and the antenna element 3 is electrically connected via the metal fitting 2 and the feeder 5 to the aerial coupled circuits and the transmission/receiving circuits (both of which are not shown) of the communication device. Since the metal fitting 2 is securely caught between the top and bottom dies 4a and 4b, the antenna element 3 is correctly positioned inside the moulding die 4.

The top and bottom dies 4a and 4b define a cavity 6 which is cylindrical hollow having a diameter equal to or slightly greater than the outer diameter of the coil of the antenna element 3. In this embodiment, the diameter of the cavity 6 is set to 4.53 mm, which is 0.03 mm greater than the outer diameter of the antenna element 3. This condition allows the antenna element 3 to be inserted without bending or rubbing against the inner face of the moulding die 4, while the inserted antenna element 3 easily comes, into contact with the inner face of the moulding die 4 in the subsequent primary moulding process, which will be explained in detail below.

One end 6a of the cylindrical cavity 6 which receives the free end of the antenna element 3 is a hemispherical concave. When the first moulding resin is injected and cured in this concave, an insulating cap 7 can be monolithically formed.

The first moulding resin to be injected in the first moulding die 4 is thermoplastic insulating composite resin, such as polyester elastomer. The first moulding resin is heated prior to the injection, and the molten resin is injected from the gate G into the cavity 6. Due to the injection pressure of the first moulding resin which flows in the cylindrical cavity 6, a pressure in the longitudinal direction along the coil axis, which tries to shift the antenna element 3 along the coil axis, and a pressure in the radial direction, which tries to expand the coil diameter outward, are simultaneously applied to the antenna element 3. The pressure in the radial direction generates a friction force between the coil of the antenna element 3 and the inner face of the moulding die 4. This friction force overcomes the pressure in the longitudinal direction, whereby the antenna element can be maintained in the correct position in the cavity 6 without shifting along the coil axis.

Figure 2:
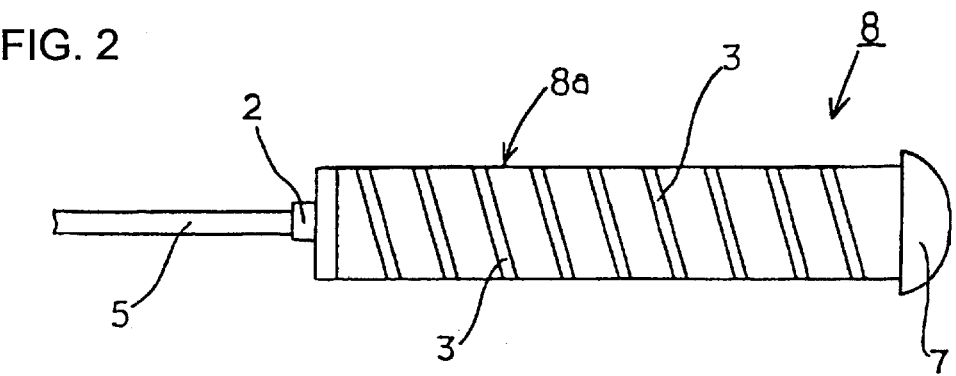
FIG. 2 is a side view of the primary moulded product formed by the first moulding die.

FIG. 2 illustrates a primary moulded product 8 taken out of the first moulding die 4. The antenna element 3 is embedded in the column-like primary product 8 along the cylindrical surface 8a. The hemispherical insulating cap 7 is also monolithically formed on the tip of the primary product 8. Since the pitch of the antenna element 3 is not affected by the injection pressure, a high-quality antenna can be produced with little deviation from the designed pitch.

This primary product 8 is then put in the cavity 9 of the second moulding die 9 in order to monolithically form an insulating layer 11 to cover the antenna element 3 of the primary product 8. In the cavity 10, the insulating cap 7 and the feeder 5 are retained between the top and bottom dies 9a and 9b so that a gap is formed between the cylindrical surface 8a of the column-like primary product 8 and the inner wall of the moulding die 9. The width of the gap corresponds to the thickness of the insulating layer 11.

Figure 3:
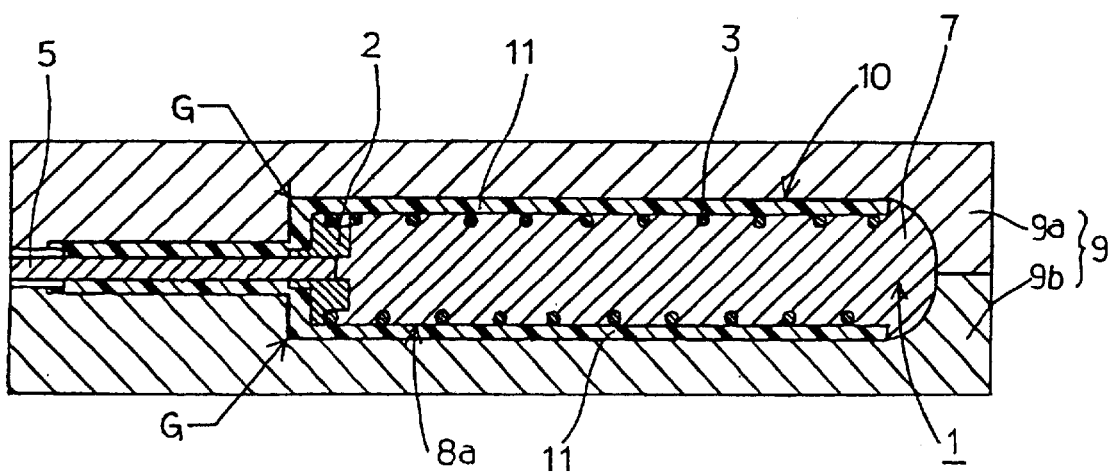
FIG. 3 is a cross-sectional view showing the second moulding step of the method for forming a helical antenna, in which the second insulating resin is injected and cured in the cavity, according to the first embodiment of the invention.

FIG. 3 is a cross-sectional view showing that the second moulding resin is injected in the gap between the primary product 8 and the second moulding die 9 from the two gates G formed in the second moulding die 9. The second moulding resin is the same material as the first moulding resin, that is, a thermoplastic insulating composite resin, such as polyester elastomer. By injecting the molten second moulding resin into the cavity 10 from the gates G, the antenna element 3 is covered with an insulating layer with a uniform thickness. This thickness equals the step size from the cylindrical surface 8a of the column-like antenna to the bottom face of the insulating cap 7. Accordingly, as a result of the second moulding (or the injection), the insulating layer 11 and the insulating cap 7 are integrated with each other so as to have a smooth and continuous surface.

Thus, the helical antenna 1, in which the antenna element 3 is incorporated into the monolithically formed insulating cap 7 and the insulating layer 11, is completed. Since the helical antenna 1 of this embodiment is a column-like rigid antenna, the antenna element 3 can be safely protected from undesirable external forces, and it can prevent breakage of the insulating layer 11 or the insulating cap 7.

Because the pitch of the antenna element 3 can be maintained constant throughout the moulding process, the electric properties of the resultant antenna, including the resonant frequency, can be maintained stable.

Although, in the first embodiment, the insulating layer 11 is formed in the second moulding step, the insulating layer 11 may be monolithically formed first so as to incorporate the antenna element.

Next, the second embodiment of the method for forming a helical antenna according to the invention will be described with reference to FIGS. 4 through 8. The same elements as those in the first embodiment will be denoted by the same numerical references, and the explanation for them will be omitted.

Figure 4:
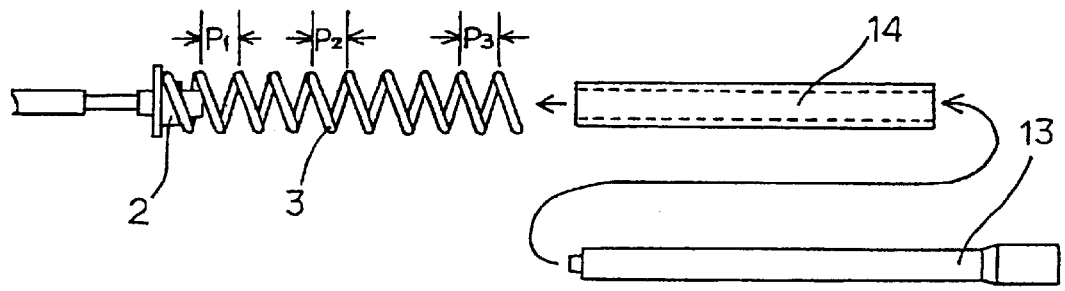
FIG. 4 is a side view of the antenna element, into which the cylindrical shell is to be inserted, according to the second embodiment of the invention.

In the second embodiment, a cylindrical shell 14, in which a core pin 13 of a moulding die 12 is inserted in advance, is used, as shown in FIG. 4. The outer diameter of the cylindrical shell 14 is slightly smaller than the inner diameter of the coil of the antenna element 3.

Figure 5:
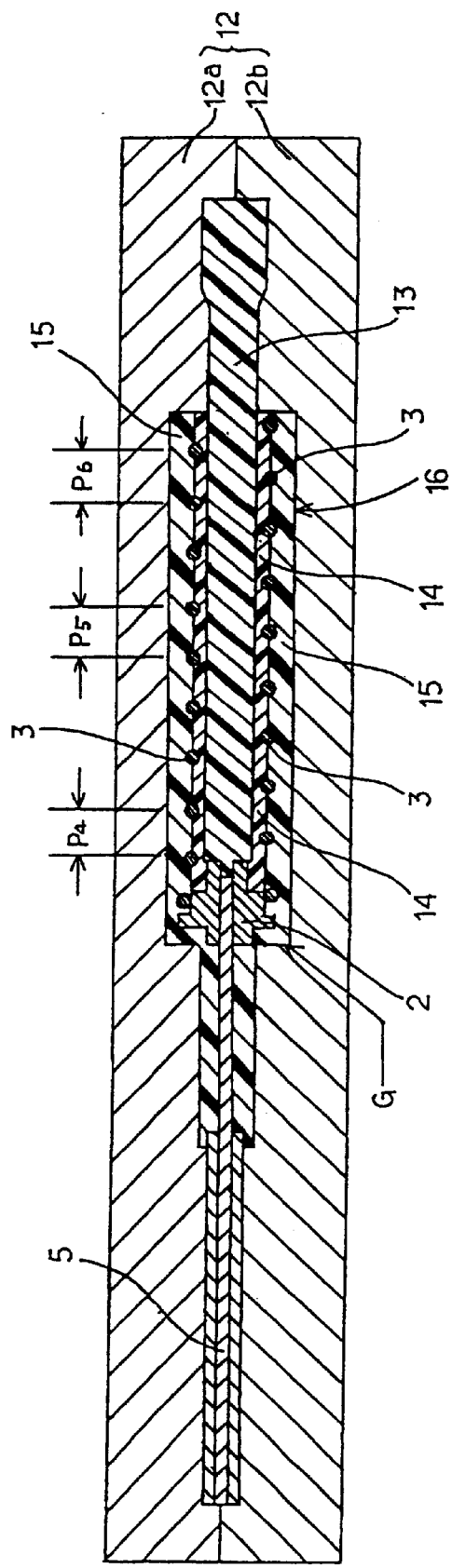
FIG. 5 is a cross-sectional view showing the moulding step of the method for forming a helical antenna, in which the moulding resin is injected into the moulding die, according to the second embodiment of the invention.

The cylindrical shell 14 which received the core pin 13 is inserted in the antenna element 13 from the free end of the helically coiled antenna element 3 along the coil axis until the tip of the core pin 13 comes into contact with the metal fitting 2. This state is illustrated in FIG. 5.

The cylindrical shell 14 is made of an insulating material whose melting point is lower than the injection temperature of the molten resin for forming the insulating layer 15. In this embodiment, while the moulding resin for forming the insulating layer 15 is a thermoplastic insulating composite resin, such as polyester elastomer, with a melting point of 200° C., the cylindrical shell 14 is made of vinyl chloride having a melting point of 160° C. which is lower than the injection temperature.

The antenna element 3 supported by the metal fitting 2, and the cylindrical shell 14 with the core pin 13 inserted in the antenna element 3 are put in the cavity 16 of the moulding die 12. In the cavity 16, the core pint 13 and the feeder 5 are retained between the top and bottom dies 12a and 12b so that a gap is generated between the antenna element and the inner wall of the moulding die 12, as shown in FIG. 5. The width of the gap corresponds to the thickness of the insulating layer 15.

In this state, the moulding resin, which was heated up to a temperature higher than the melting point of the cylindrical shell, is injected in the cavity 16 from the gate G of the moulding die 12 in order to form the insulating layer 15.

The injected resin flows along the outer surface of the cylindrical shell 14 and covers the coil of the antenna element 3. Since the melting point of the cylindrical shell 14 is lower than the temperature of the injected resin, the surface of the cylindrical shell starts softening upon contact with the injected resin. The melting surface of the cylindrical shell 14 sticks to the coil of the antenna element 3, and keeps the pitch P of the antenna element 3 constant in the axial direction during the injection of the moulding resin.

Tables 1 and 2 show the pitch P of the antenna element 3 before and after the injection-moulding. Table 1 lists the pitches P1, P2 and P3 (see FIG. 4) at the base, the center, and the tip of each of the arbitrarily selected five antenna elements 3 before the moulding. Table 2 lists the pitches P4, P5 and P6 (see FIG. 5) at the same positions of arbitrarily selected five antenna elements 3 after the moulding.

As is clear from Tables 1 and 2, after the moulding, the pitch P4 at the base of the antenna element 3 becomes slightly longer than the pitch P5 at the tip of the antenna element 3 because the injection gate G is formed near the base of the antenna element. However, this slight deviation is within the acceptable error, and is much better than the pitch deviation in the conventional method, in which the pitches P1', P2' and P3' after the injection become 3.18 mm, 2.68 mm, and 1.44 mm, respectively. In contrast, with the method of the present invention, the pitch of the antenna element can be maintained substantially constant even after the moulding process for integrating the antenna element 3 and the insulating layer 15 into a single unit.

TABLE 1

| sample No. | pitch (mm) of the antenna element | | |
|---|---|---|---|
| | P1 at base | P2 at center | P3 at tip |
| 1 | 2.49 | 2.42 | 2.46 |
| 2 | 2.49 | 2.42 | 2.46 |
| 3 | 2.49 | 2.44 | 2.47 |
| 4 | 2.49 | 2.43 | 2.47 |
| 5 | 2.49 | 2.44 | 2.46 |
| Average | 2.49 | 2.43 | 2.464 |

TABLE 2

| sample No. | pitch (mm) of the antenna element | | |
|---|---|---|---|
| | P4 at base | P5 at center | P6 at tip |
| 11 | 2.64 | 2.46 | 2.45 |
| 12 | 2.63 | 2.45 | 2.44 |
| 13 | 2.68 | 2.45 | 2.44 |
| 14 | 2.65 | 2.46 | 2.45 |
| 15 | 2.67 | 2.45 | 2.44 |
| Average | 2.654 | 2.454 | 2.444 |

The injected moulding resin fills the gap between the antenna element 3 and the inner wall of the moulding die 12. When this molten resin hardened, the insulating layer 15 is formed of the antenna element, while integrating the antenna element 3 and the softened surface of the cylindrical shell into a single unit (shown in FIG. 5). Then, the core pin 13 is removed, and a cylindrical antenna 17 with the antenna element 3 covered with the monolithic insulating layer 15 is obtained.

This cylindrical antenna 17 functions as a helical antenna as it is. However, it is preferable to cover the opening 18a (shown in FIG. 6) of the center hole 18 of the cylindrical antenna 17 with an insulating cap 19.

In this embodiment, the cylindrical antenna 17 is put in the second moulding die 21 to monolithically form the insulating cap 19 at the end portion of the cylindrical antenna 17, thereby covering the opening 18a.

Figure 6:
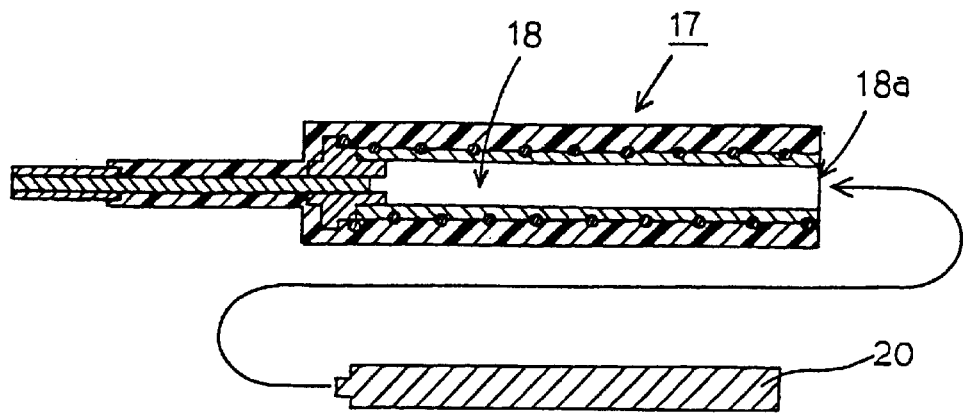
FIG. 6 is a cross-sectional view of the cylindrical antenna formed according to the second embodiment of the invention.
Figure 7:
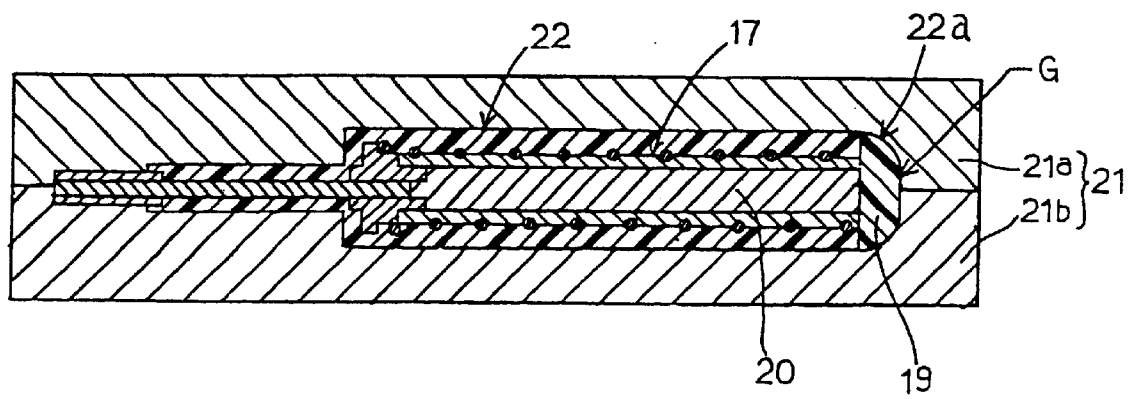
FIG. 7 is a cross-sectional view showing the second moulding step of the method for forming a helical antenna according to the second embodiment of the invention, in which the cylindrical antenna is inserted in the second moulding die, and the second insulating resin is injected and cured in the cavity of the second moulding die.

Prior to putting the cylindrical antenna 17 in the second moulding die 21, a core stick 20 is inserted in the center hole 18, as shown in FIG. 6. The core stick 20 has substantially the same shape as the core pin 13. The reason for inserting the core stick 20 is to prevent the second moulding resin from flowing into the center hole 18, because if the second moulding resin having filled the center hole 18 is cured, the outer surface of the helical antenna 30 may become uneven due to the strain.

If the cylindrical antenna 17 with the core stick 20 is put in the cavity 22 of the second moulding die 21, which is defined by the top and bottom moulding dies 21a and 21b, a hemispherical gap 22a (shown in FIG. 7) is generated next to the tip of the cylindrical antenna 17. The second moulding resin, which was heated and molten, is injected into the hemispherical gap 22a from the gate G. The second moulding resin is preferably the same material as the first moulding resin used to form the insulating layer 15.

Accordingly, the second moulding resin is polyester elastomer in this embodiment.

Figure 8:
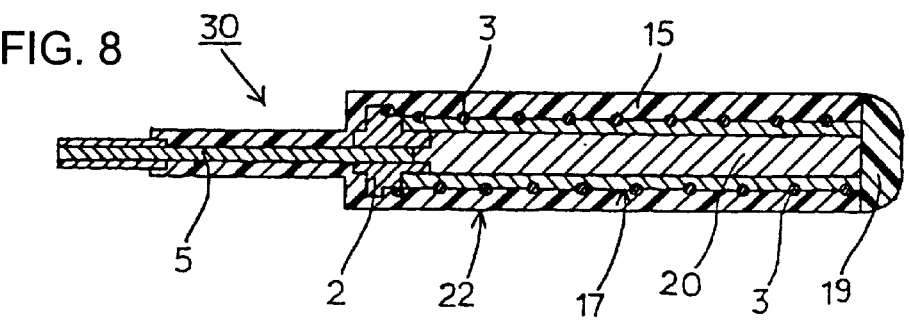
FIG. 8 is a cross-sectional side view of the helical antenna formed by the method of the second embodiment.
Figure 9:
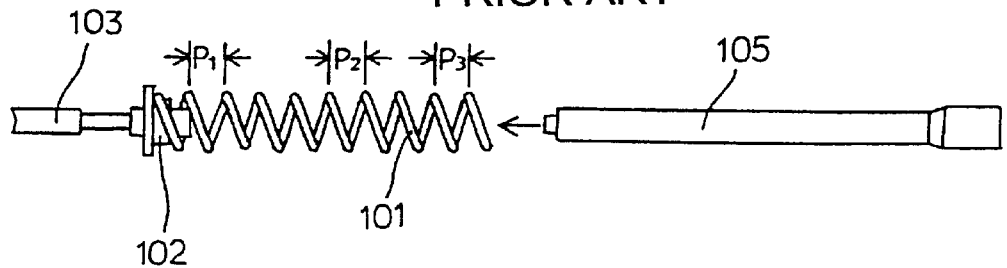
FIG. 9 shows the preliminary step for forming a helical antenna in a side view according to a conventional method.
Figure 10:
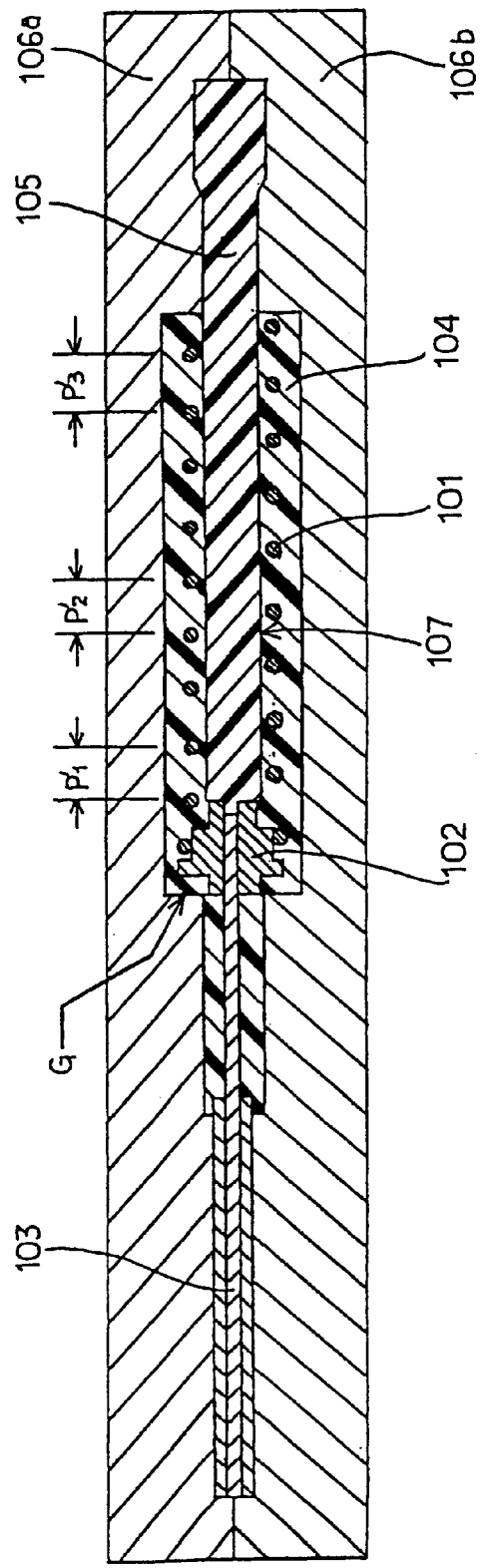
FIG. 10 is a cross-sectional view showing the moulding step of the conventional method, which is performed after the preliminary step shown in FIG. 9, in which the moulding resin is injected in the moulding die to form an insulating cover.
Figure 11:
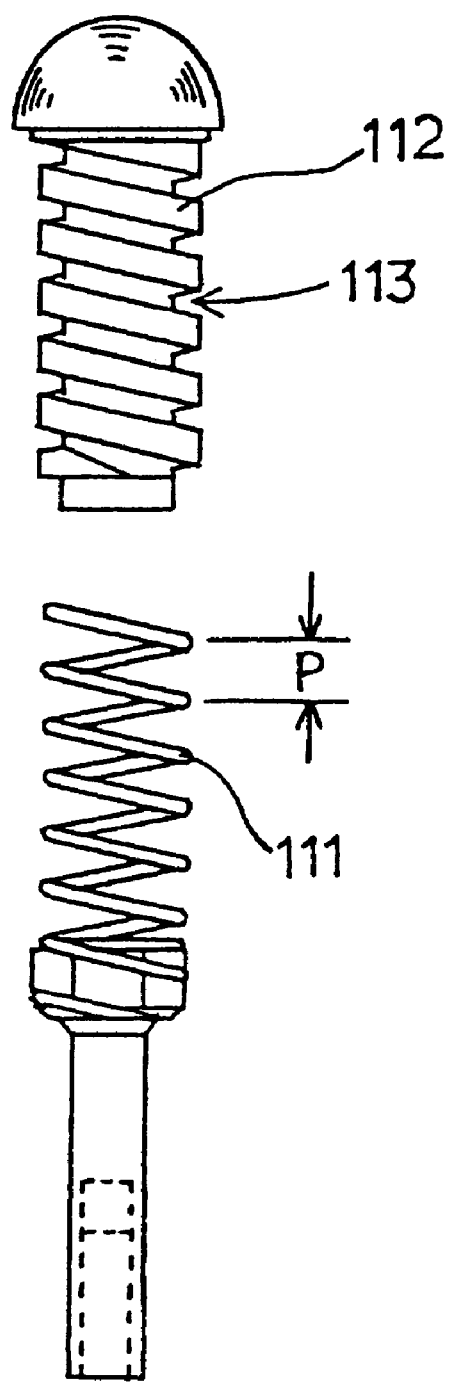
FIG. 11 is a side view showing another prior art method for forming a helical antenna, in which an insulating cap is attached to the antenna element.
Figure 12:
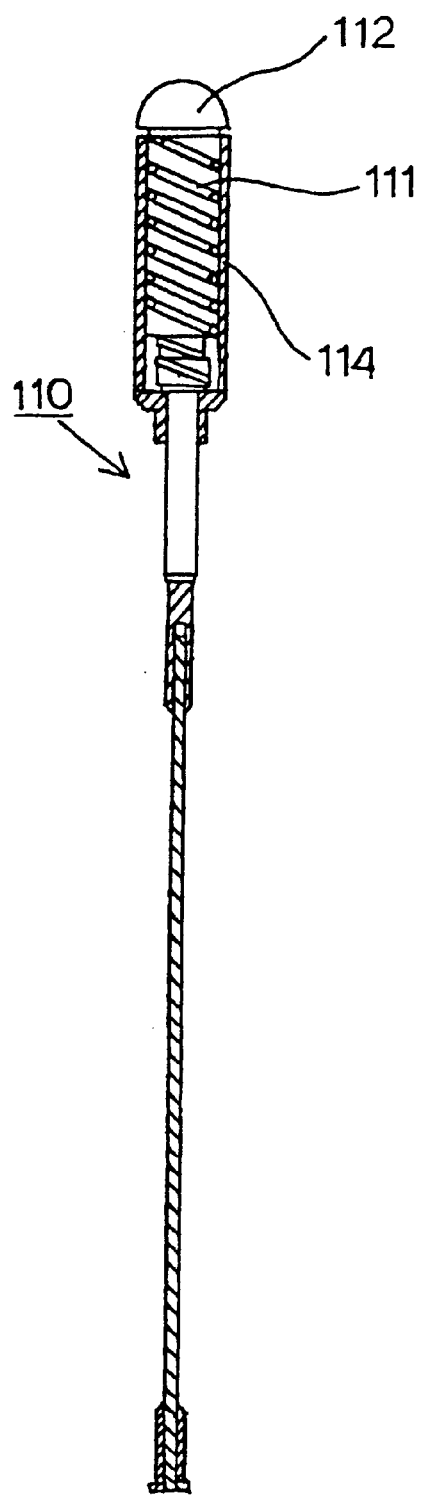
FIG. 12 is a cross-sectional side view of the helical antenna formed by the prior art method shown in FIG. 11.

FIG. 8 illustrates the helical antenna 30 removed from the second moulding die 21 after the second moulding resin (or the insulating cap 19) was cured. As the result of the hardening of the second moulding resin, the insulating cap 19 covering the aperture 18a is integrally coupled with the end portion of the insulating layer 15.

The helical antenna 30 formed according to the second embodiment also has the advantage that the insulating layer 15 hardly breaks or the insulating cap 19 hardly comes off from the antenna 30 even if unexpected external forces are applied to the helical antenna 30. Furthermore, displacement or deformation of the antenna element 3 due to the injection pressure can be prevented, and the pitch of the antenna element 3 can be maintained at the designed value.

TABLE 3

| sample No. | antenna element 3 | |
| --- | --- | --- |
| | resonant freq. MHz | VSWR |
| 1 | 881.7 | 1.05 |
| 2 | 881.4 | 1.05 |
| 3 | 881.1 | 1.05 |
| 4 | 880.6 | 1.04 |
| 5 | 881.3 | 1.05 |
| 6 | 880.8 | 1.03 |
| 7 | 881.5 | 1.03 |
| 8 | 881.4 | 1.03 |
| 9 | 880.8 | 1.03 |
| 10 | 880.6 | 1.04 |
| MAX | 881.7 | 1.05 |
| MIN | 880.6 | 1.03 |
| AVERAGE | 881.12 | 1.04 |
| σ | 0.376 | 0.0089 |

Tables 3 and 4 exhibit the electric properties of the antenna before and after the moulding of the insulating layer 15 according to the invention. More specifically, Table 3 shows the electric properties of arbitrarily selected ten antenna elements 3 before the insulating layer 15 is formed, and Table 4 shows the electric properties of arbitrarily selected ten helical antennas 30, in each of which the insulating layer 15 and the insulating cap 19 are monolithically formed.

TABLE 4

| sample No. | helical antenna 30 | |
| --- | --- | --- |
| | resonant freq. MHz | VSWR |
| 21 | 831.5 | 1.07 |
| 22 | 830.4 | 1.07 |
| 23 | 830.1 | 1.08 |
| 24 | 830.4 | 1.06 |
| 25 | 831.1 | 1.08 |
| 26 | 831.7 | 1.08 |
| 27 | 831.6 | 1.08 |
| 28 | 830.8 | 1.08 |
| 29 | 831.0 | 1.08 |
| 30 | 830.6 | 1.07 |
| MAX | 831.7 | 1.08 |
| MIN | 830.1 | 1.06 |
| AVERAGE | 830.92 | 1.075 |
| σ | 0.526 | 0.006 |

As is clear from Tables 3 and 4, any of the samples of monolithically formed helical antenna 30 have the resonant frequencies near 830 MHz which is the designed value. The standard deviations (σ) of both the resonant frequency and the voltage to standing wave ratio (VSWR) of the final product (i.e, the helical antenna 30) are not very much offset from the standard deviations generated in forming the antenna element 3. Thus, the electric properties of the antenna can be maintained even after the moulding process with little variations.

As compared with the first embodiment, the helical antenna 30 formed by the second embodiment can be made slimmer because the insulating layer 15 is formed first on the antenna element and the cylindrical shell. In the first embodiment, the insulating layer 11 is monolithically formed on the primary product 8 after the primary product was moulded. In this case, the insulating layer 11 needs to have a certain thickness to smooth the uneven surface of the primary product 8. In contrast, in the second embodiment, a relatively thin insulating layer 15 can be formed over the antenna element 3.

Although, in the second embodiment, the insulating cap 19 is formed monolithically using the second moulding die 21, the insulating cap 19 may be formed separately, and may be attached to the opening 18a by adhesive or other connection means.

The moulding resin for forming the insulating layer 15 is heated up to a temperature higher than the melting point of the cylindrical shell 14, and the molten resin at that temperature is injected into the cavity 16. However, the invention is not limited to this method.

The moulding resin heated up to a temperature slightly lower than the melting point of the cylindrical shell 14. In this case, the cylindrical shell 14 thermally expands upon contacting with the injected molten resin, and presses against the antenna element 3 in the radial direction from the inside, thereby preventing the deformation of the antenna element 3 in the axial direction due to the injection pressure.

In either embodiment of the helical antenna 1 or 30, the antenna element is connected to the feeder 5 via the metal fitting 2. However, a rod antenna element may be connected to the base or the tip of the helical antenna element 3 in series.

As has been explained, even after the moulding resin is injected to form the insulating layer over the antenna element, the electrical properties of the antenna element can be maintained without being affected by the injection pressure. Consequently, the product yield of the helical antenna can be increased.

The method of the present invention does not require the assembling step of an insulating cover because the insulating layer is monolithically formed over the antenna element. The monolithically formed insulating layer does not easily break or come off, and can reliably protect the antenna element.

According to the second embodiment, the insulating layer 15 is formed only once over the antenna element, and a slim helical antenna with a reduced diameter can be achieved.

By heating the moulding resin up to a temperature higher than the melting point of the cylindrical shell inserted in the antenna element, the softened cylindrical shell retains the antenna element at the correct position, whereby deformation of the antenna element due to the injection pressure can be prevented.

The monolithically formed insulating cap can also reliably protect the antenna element because it does not come off from the antenna element even on undesirable impact.

Although the invention has been described based on the preferred embodiments, the invention is not limited to these embodiments. It should be appreciated that there are many modifications and substitutions without departing from the spirit and scope of the invention, which is defined by the appended claims.

What is claimed is:

1. A method for forming a helical antenna having a helical antenna element covered with an insulating layer, the antenna element and the insulating layer being monolithically moulded, and the antenna element having a base which is supported by a metal fitting, the method comprising the steps of:

(a) inserting the antenna element into an cylindrical cavity of an first moulding die, an inner diameter of the cylindrical cavity being equal to or slightly greater than an outer diameter of the antenna element;

(b) injecting a first insulating resin into the cylindrical cavity to produce a primary moulded product in which the antenna element is monolithically integrated into the first insulating resin, an injection pressure causing the antenna element to expand outward in an radial direction thereof, and further causing a friction force between the antenna element and an inner surface of the first moulding die so that a pitch of the antenna element is maintained during the moulding operation;

(c) putting the primary moulded product in a cavity of a second moulding die so that a prescribed gap is formed between a cylindrical surface of the primary moulded product and an inner surface of the second moulding die; and (d) injecting a second insulating resin into the cavity of the second moulding die so that the cylindrical surface of the primary moulded product is monolithically covered with an insulating layer made of the second insulting resin, whereby the antenna element is completely covered with the monolithically formed insulating layer.

2. A method for forming a helical antenna having a helical antenna element covered with an insulating layer, the antenna element and the insulating layer being monolithically moulded, and the antenna element having a base which is supported by a metal fitting, the method comprising the steps of:

(a) inserting a core pin of a moulding die into a cylindrical shell made of an insulating resin;

(b) inserting the cylindrical shell, in which the core pin of the moulding die was inserted, into the antenna element along a longitudinal axis of the antenna element;

(c) retaining the antenna element in a cavity defined by the moulding die so that a prescribed gap is formed between the antenna element and an inner surface of the moulding die;

(d) injecting a molten resin into the cavity to form an insulating cover which monolithically integrates the antenna element and the cylindrical shell;

(e) removing the core pin from the cylindrical shell to produce a cylindrical antenna;

(f) covering an aperture of the cylindrical antenna with an insulating cap, whereby the helical antenna having the antenna element completely surrounded by the insulating cover is completed, wherein the insulating resin forming the insulating cover is heated and molten at a temperature higher than at least the melting point of the insulating resin of the cylindrical shell, and the molten resin at said temperature is injected into the cavity so that the cylindrical shell thermally expands and retains the inner face of the antenna element, whereby a pitch of the antenna element can be kept constant.

3. The method according to claim 2, further comprising the steps of:

retaining the cylindrical antenna, from which the core pin has been removed, in a second moulding cavity; and injecting a second moulding resin to monolithically form an insulating cap at the aperture of the cylindrical antenna.

4. A method for forming a helical antenna having a helical antenna element covered with an insulating layer, the antenna element and the insulating layer being monolithically moulded, and the antenna element having a base which is supported by a metal fitting, the method comprising the steps of:

(a) inserting a core pin of a moulding die into a cylindrical shell made of an insulating resin;

(b) inserting the cylindrical shell, in which the core pin of the moulding die was inserted, into the antenna element along the longitudinal axis of the antenna element;

(c) retaining the antenna element in a cavity defined by the moulding die so that a prescribed gap is formed between the antenna element and the inner surface of the moulding die;

(d) injecting a molten resin into the cavity to form an insulating cover which monolithically integrates the antenna element and the cylindrical shell;

(e) removing the core pin from the cylindrical shell to produce a cylindrical antenna;

(f) covering the aperture of the cylindrical antenna with an insulating cap, whereby the helical antenna having the antenna element completely surrounded by the insulating cover is completed, (g) retaining the cylindrical antenna, from which the core pin has been removed, in a second moulding cavity; and (h) injecting a second moulding resin to monolithically form an insulating cap at the aperture of the cylindrical antenna, wherein the insulating resin forming the insulating cover is heated and molten at a temperature higher than at least the melting point of the insulating resin of the cylindrical shell, and the molten resin at said temperature is injected into the cavity.

* * * * *